US012665272B2

(12) United States Patent
Machida et al.

(10) Patent No.: US 12,665,272 B2
(45) Date of Patent: Jun. 23, 2026

(54) BATTERY

(71) Applicants: PRIMEARTH EV ENERGY CO., LTD., Kosai (JP); PRIME PLANET ENERGY & SOLUTIONS, INC., Tokyo (JP); TOYOTA JIDOSHA KABUSHIKI KAISHA, Toyota (JP)

(72) Inventors: Keitaro Machida, Hamamatsu (JP); Tomoki Mizuno, Hamamatsu (JP); Koichi Tanimoto, Takarazuka (JP)

(73) Assignees: TOYOTA BATTERY CO., LTD., Kosai (JP); PRIME PLANET ENERGY & SOLUTIONS, INC., Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 521 days.

(21) Appl. No.: 18/233,629

(22) Filed: Aug. 14, 2023

(65) Prior Publication Data
US 2024/0079741 A1 Mar. 7, 2024

(30) Foreign Application Priority Data
Sep. 5, 2022 (JP) ................................. 2022-140738

(51) Int. Cl.
*H01M 50/184* (2021.01)
*H01M 50/188* (2021.01)
*H01M 50/553* (2021.01)

(52) U.S. Cl.
CPC ....... *H01M 50/553* (2021.01); *H01M 50/184* (2021.01); *H01M 50/188* (2021.01)

(58) Field of Classification Search
CPC . H01M 50/184; H01M 50/188; H01M 50/553
See application file for complete search history.

(56) References Cited

U.S. PATENT DOCUMENTS

2005/0095502 A1 5/2005 Sugimune et al.
2015/0229006 A1* 8/2015 Kawase ................ H01M 50/55
429/61
(Continued)

FOREIGN PATENT DOCUMENTS

CN 114824684 A * 7/2022 .......... H01M 50/188
JP 2000208130 A * 7/2000
(Continued)

*Primary Examiner* — Kevin E Yoon
(74) *Attorney, Agent, or Firm* — Oliff PLC

(57) ABSTRACT
In a battery, a terminal member includes: a columnar portion; a head portion, outside an outer casing, having a larger diameter than a through hole of a lid; and an umbrella-shaped portion, more inside than a current collecting member, having a larger diameter than a through hole of the current collecting member to closely contact an inside surface thereof. A gasket includes: a plate-shaped portion between the lid and the head portion; and a cylindrical portion between a wall surface of the through hole of the lid and the columnar portion. An insulator includes: a plate-shaped portion between the lid and the current collecting member; and a cylindrical portion between the wall surface of the through hole of the lid and the columnar portion. Leading ends of the cylindrical portions close contact each other between the wall surface of the through hole of the lid and the columnar portion.

4 Claims, 4 Drawing Sheets

(56)          References Cited

U.S. PATENT DOCUMENTS

2017/0229686  A1      8/2017  Takasu
2019/0363401  A1    11/2019  Lee et al.

FOREIGN PATENT DOCUMENTS

JP          2005-129488  A      5/2005
JP          2015-022941  A      2/2015
JP          2017-084733  A      5/2017
JP          2017-142929  A      8/2017

* cited by examiner

BATTERY

CROSS-REFERENCE TO RELATED APPLICATIONS

This application is based upon and claims the benefit of priority to Japanese Patent Application No. 2022-140738 filed on Sep. 5, 2022, the entire contents of which are incorporated herein by reference.

BACKGROUND

Technical Field

The present disclosure relates to a battery including a terminal member provided extending through a through hole of an outer casing into and out of the outer casing, a current collecting member connecting a power generating element to the terminal member within the outer casing, and an insulation member for insulating the terminal member from the outer casing.

Related Art

In some conventional batteries, an insulating member is placed between a terminal member and an outer casing to insulate therebetween. One example of such batteries is disclosed in Japanese unexamined patent application publication No. 2000-208130 (JP2000-208130A). In the battery described in this publication, a battery case (i.e., an outer casing) includes a lid formed with a mounting hole. In this mounting hole of the lid, an output terminal extends into and out of the battery case. The output terminal has a head located outside the battery case and a rod extending from the head toward the inside of the battery case. A distal end of the rod of the outer terminal, located within the battery case, is deformed to extend radially outward inside the battery case, forming a swaged rod portion. A gasket is placed between the mounting hole of the lid and the rod of the output terminal. This gasket is a plastic molded product integrally including a flange portion located outside the battery case and receives the head of the output terminal and a boss portion having a circular rod shape protruding from the undersurface of the flange portion. The thus configured gasket keeps the sealing of the battery between the lid and the output terminal while insulating between them.

SUMMARY

Technical Problems

Meanwhile, during charging and discharging of a battery, the temperature of the terminal member of the battery rises. As the temperature of the terminal member rises, the temperature of the insulation member in contact with the terminal member also rises. The larger the contact area of the terminal member with the insulation member, the more likely it is that the temperature of the insulation member will also rise as the temperature of the terminal member rises during charging and discharging of the battery. In general, the insulation member tends to deteriorate faster when its temperature remains high. If the insulation member deteriorates, the contact strength with the terminal member may decrease, and thus the insulating function and the sealing function of the insulation member may degrade.

In the above-mentioned conventional art, a most part of the side surface of the rod of the outer terminal is covered by the boss of the gasket. In other words, the output terminal and the gasket are in contact with a large contact area. This configuration may cause the gasket to quickly deteriorate as the battery is charged and discharged. Consequently, the insulating function and the sealing function of the gasket could not be appropriately maintained over a long period.

The present disclosure has been made to address the above problems and has a purpose to provide a battery capable of appropriately maintaining insulating and sealing between an outer casing and a terminal member over a long period.

Means of Solving the Problems

To achieve the above-mentioned purpose, one aspect of the present disclosure provides a battery comprising: an outer casing formed with a through hole; a power generating element housed in the outer casing; a terminal member provided extending through the through hole into and out of the outer casing; a current collecting member connecting the power generating element and the terminal member within the outer casing; an external insulation member placed outside the outer casing to insulate the terminal member from the outer casing; and an internal insulation member placed inside the outer casing to insulate the current collecting member from the outer casing, wherein the current collecting member is formed with a through hole at a position overlapping the through hole of the outer casing, the terminal member includes: a columnar portion located in the through hole of the outer casing and the through hole of the current collecting member; a head portion continuous to the columnar portion, the head portion radially extending, outside the outer casing, to have a larger diameter than the through hole of the outer casing; and an umbrella-shaped portion continuous to the columnar portion, the umbrella-shaped portion radially extending, inside the outer casing more than the current collecting member, to have a larger diameter than the through hole of the current collecting member, so that the umbrella-shaped portion is in close contact with an inside surface of the current collecting member, the external insulation member includes: an external plate-shaped portion held between an outer surface of the outer casing and the head portion of the terminal member; and an external cylindrical portion continuous to the external plate-shaped portion and held between a wall surface defining the through hole of the outer casing and the columnar portion of the terminal member, the internal insulation member includes: an internal plate-shaped portion held between an inner surface of the outer casing and the current collecting member; and an internal cylindrical portion continuous to the internal plate-shaped portion and held between the wall surface defining the through hole of the outer casing and the columnar portion of the terminal member, and a leading end of the external cylindrical portion of the external insulation member and a leading end of the internal cylindrical portion of the internal insulation member are in close contact with each other between the wall surface defining the through hole of the outer casing and the columnar portion of the terminal member.

In the battery configured as above, the external insulation member and the internal insulation member seal between the outer casing and the terminal member. Further, those outer and internal insulation members insulate between the outer casing and the terminal member. Accordingly, the thus configured battery can disperse the heat generated by the terminal member during charging and discharging to both the outer and internal insulation members to suppress the temperature of each of the outer and internal insulation members from rising. Thus, both the external insulation member and the internal insulation member can be prevented from deteriorating in a short period due to the temperature rise. The aforementioned battery can appropriately maintain insulating and sealing between the outer casing and the terminal member over a long period.

The present disclosure can provide a battery that can appropriately maintain insulating and sealing between the outer casing and the terminal member for a long period.

DETAILED DESCRIPTION OF THE EXEMPLARY EMBODIMENTS

Figure 1:
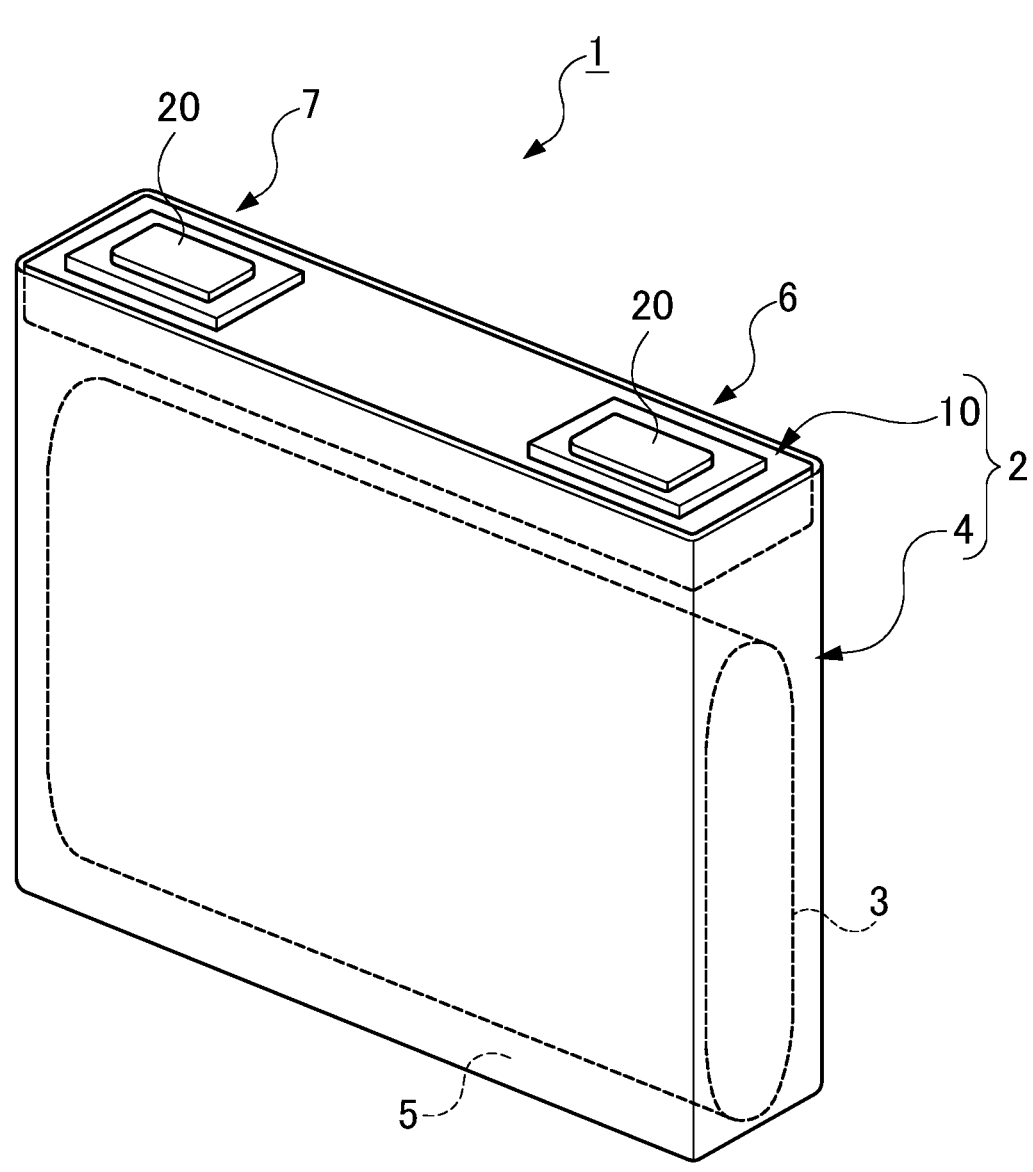
FIG. 1 is a perspective external view of a battery in an embodiment.

A detailed description of an embodiment of this disclosure will now be given referring to the accompanying drawings. As schematically illustrated in FIG. 1, a battery 1 in the present embodiment includes an outer casing 2 and a power generating element 3 housed in the outer casing 2. The power generating element 3 is a wound body of positive and negative electrode sheets laminated on top of each other. The outer casing 2 consists of a casing body 4 and a lid 10. The casing body 4 and the lid 10 constituting the outer casing 2 are each made of electrically conductive materials. The outer casing 2 further contains an electrolyte 5.

The battery 1 has a flat rectangular box-like outer shape as a whole. In the lid 10, which is the upper part of the battery 1, near both ends in a longitudinal direction (i.e., a lateral direction in FIG. 1), external terminals 6 and 7 for positive and negative electrodes are placed. These external terminals 6 and 7 each include a terminal member 20 attached to the lid 10 through insulation members. This configuration will be described in detail later. The terminal member 20 is made of electrically conductive material. The terminal member 20 of the external terminal 6 and the terminal member 20 of the external terminal 7 are connected separately to either the positive electrode sheet or the negative electrode sheet of the power generating element. Thus, the battery 1 can be charged or discharged through the terminal members 20 of the external terminals 6 and 7.

Figure 2:
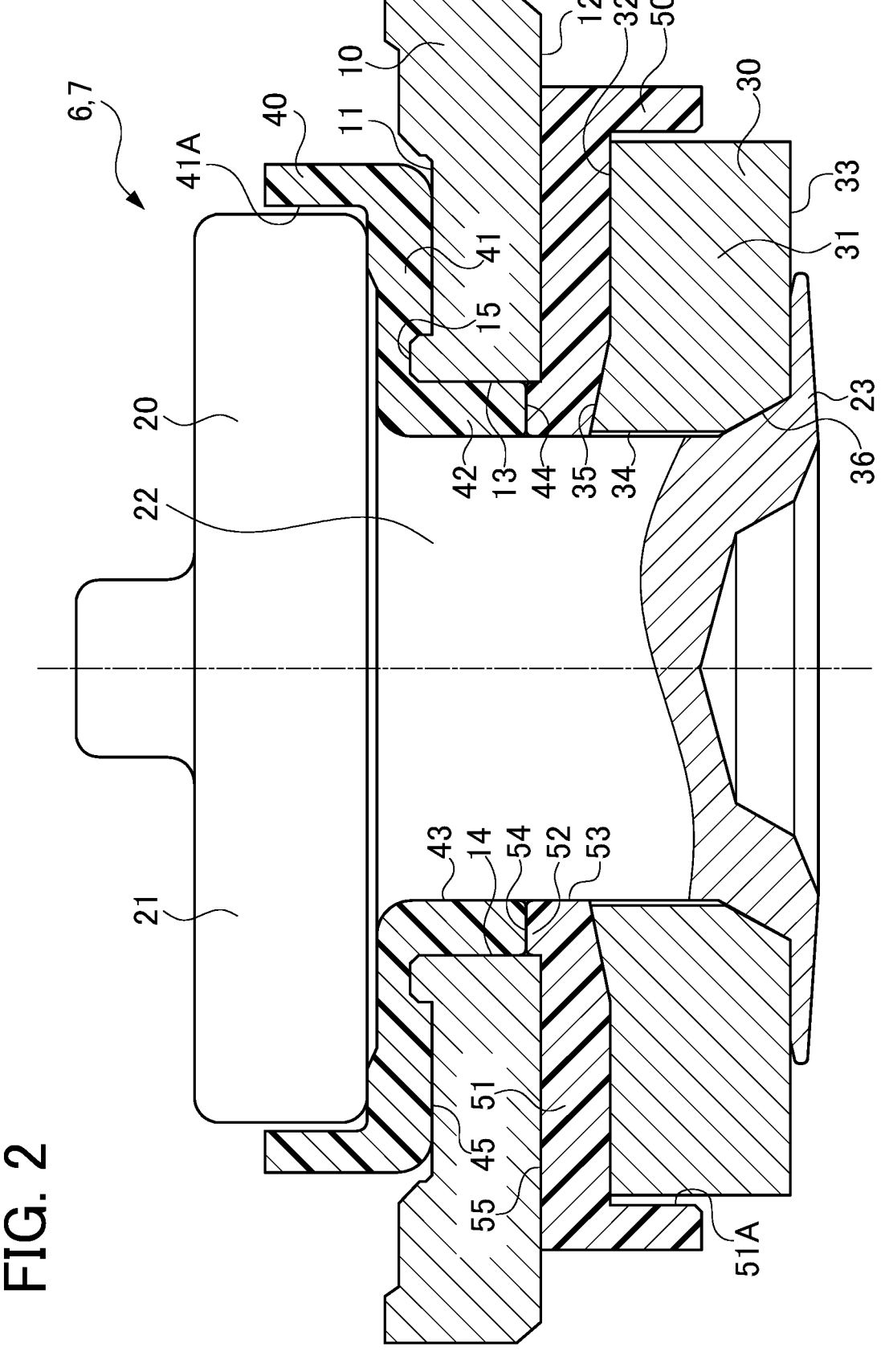
FIG. 2 is a cross-sectional view of an external terminal of the battery in the embodiment.

FIG. 2 is a cross-sectional view showing one of the external terminals 6 and 7 of the battery 1, because the external terminals 6 and 7 are identical in structure. As shown in FIG. 2, the battery 1 includes a current collecting member 30, a gasket 40, and an insulator 50 in addition to the terminal member 20 as constituent parts of the external terminal 6 or 7 and its surroundings.

The lid 10 is a plate-shaped member. This lid 10 has an outer surface 11 and an inner surface 12 which are end faces opposite each other in the thickness direction of the lid 10. In FIG. 2, the lower side under the inner surface 12 of the lid corresponds to the inside of the outer casing 2. The lid 10 is formed with a through hole 13 extending through the lid 10 in the thickness direction. The lid 10 is formed, on the outer surface 11, with a protruding portion 15 protruding to the outside of the outer casing 2 relative to the outer surface 11. This protruding portion is provided continuously extending along the opening of the through hole 13 on the outer surface 11.

The current collecting member 30 connects the power generating element 3 to the terminal member 20 within the outer casing 2. In FIG. 2, of the current collecting member 30, a terminal connecting portion 31 connected to the terminal member 20 is illustrated. The current collecting member 30 is connected, through a different portion from the terminal connecting portion 31, to either the positive electrode sheet or the negative electrode sheet of the power generating element 3. The current collecting member 30 is made of electrically conductive materials. Specifically, in one example, the current collecting member 30 used for a positive electrode is made of aluminum, while the current collecting member 30 used for a negative electrode is made of copper.

The terminal connecting portion 31 of the current collecting member 30 has a plate-like shape and has an outside surface 32 and an inside surface 33, which are end faces opposite each other in the thickness direction. The outside surface 32 faces to the inner surface 12 of the lid 10. In the current collecting member 30, the terminal connecting portion 31 is formed with a through hole 34 extending in the thickness direction. The through hole 34 of the current collecting member 30 is located at a position overlapping the through hole 13 of the lid 10. In other words, the through hole 34 of the current collecting member 30 is positioned coaxial with the through hole 13 of the lid 10.

In the present embodiment, the current collecting member 30 is formed with a raised portion 35 on the outside surface 32 around the through hole 34. This raised portion 35 has a shape that is more largely uplifted, or raised, toward the lid as is closer to the through hole 34. The current collecting member 30 is formed with a tapered portion 36 on the inside surface 33 around the through hole 34. This tapered portion 36 is more largely, or deeply, depressed, relative to the inside surface 33 which is undeformed, as closer to the through hole 34.

The terminal member 20 includes a head portion 21, a columnar portion 22, and an umbrella-shaped portion 23. Each of the head portion 21 and the umbrella-shaped portion 23 is thicker, i.e., larger in diameter, than the columnar portion 22. The columnar portion 22 extends through both the through hole 13 of the lid 10 and the through hole 34 of the current collecting member 30.

The head portion 21 is continuous to one end of the columnar portion 22 on the outside of the outer casing 2. This head portion 21 is positioned outside the outer casing 2 and extends radially outward to have a larger diameter than the through hole 13 of the lid 10.

The umbrella-shaped portion 23 is continuous to the other end of the columnar portion 22 on the inside of the outer casing 2. This umbrella-shaped portion 23 is positioned inside the outer casing 2, concretely, located inside the outer casing 2 more than the current collecting member 30. The umbrella-shaped portion 23 extends radially outward to have a larger diameter than the through hole 34 of the current collecting member 30. The umbrella-shaped portion 23 is formed by inserting the columnar portion 22 of the terminal member 20 through the above-described parts from above the outer casing 2 and then swaging a corresponding portion.

The gasket 40 and the insulator 50 are each made of a material that has elastic and insulating properties and is resistant to the electrolyte 5. Specifically, the gasket 40 may be made of for example perfluoro alkoxy fluorine resin (PFA), and the insulator 50 may be made of for example polyphenylene sulfide (PPS) containing no inorganic filler.

The gasket 40 is placed outside the outer casing 2, and serves as an external insulation member that insulates the terminal member 20 from the lid 10. The gasket 40 serving as the external insulation member includes a cylindrical portion 42 and a plate-shaped portion 41 located radially outside the cylindrical portion 42, which will be referred to as an external cylindrical portion 42 and an external plate-shaped portion 41, respectively. Further, the gasket 40 is provided with a through hole 43 defined by the inner peripheral surface of the external cylindrical portion 42. The external plate-shaped portion 41 is held between the outer surface 11 of the lid 10 and the head portion 21 of the terminal member 20. Accordingly, the external plate-shaped portion 41 is in close contact with both the outer surface 11 of the lid 10 and the head portion 21 of the terminal member 20. The external plate-shaped portion 41 is provided with a recess 41A in which the head portion 21 of the terminal member 20 is mounted.

The external cylindrical portion 42 is continuous to a part of the external plate-shaped portion 41 facing to the inside of the outer casing 2. The external cylindrical portion 42 is located in the through hole 13 of the lid 10. The columnar portion 22 of the terminal member 20 extends through the through hole 43 of the gasket 40. The external cylindrical portion 42 is held between a wall surface 14 defining the through hole 13 of the lid 10 and the columnar portion 22 of the terminal member 20. Accordingly, the external cylindrical portion 42 is in close contact with both the wall surface 14 of the through hole 13 of the lid 10 and the columnar portion 22 of the terminal member 20.

The outer surface 11 of the lid 10 contacting the external plate-shaped portion 41 of the gasket 40 is provided with a protruding portion 15. This protruding portion 15 bites into the external plate-shaped portion 41. Thus, an inside surface 45 of the external plate-shaped portion 41 is deformed along the contour of the protruding portion 15. Accordingly, this deformation of the external plate-shaped portion 41 elongates the external cylindrical portion 42, pushing its leading end 44, i.e., lowermost end in FIG. 2, toward the inside of the outer casing 2, more than when the lid 10 is not provided with the protruding portion 15.

The insulator 50 is placed inside the outer casing 2 and serves as an internal insulation member that insulates the current collecting member 30 from the lid 10. The insulator 50 includes an internal plate-shaped portion 51 and an internal cylindrical portion 52. The insulator 50 is further provided with a through hole 53 defined by the inner peripheral surface of the internal cylindrical portion 52. The internal plate-shaped portion 51 is held between the inner surface 12 of the lid 10 and the terminal connecting portion 31 of the current collecting member 30. Thus, the internal plate-shaped portion 51 is in close contact with both the inner surface 12 of the lid 10 and the current collecting member 30. The internal plate-shaped portion 51 is provided with a recess 51A in which the terminal connecting portion 31 of the current collecting member 30 is mounted.

The internal cylindrical portion 52 is continuous to a part of the internal plate-shaped portion 51 on the side facing toward the outside of the outer casing 2. The internal cylindrical portion 52 is located inside the through hole 13 of the lid 10. The columnar portion 22 of the terminal member 20 extends through the through hole 53 of the insulator 50. The internal cylindrical portion 52 is held between the wall surface 14 of the through hole 13 of the lid

10 and the columnar portion 22 of the terminal member 20. Accordingly, the internal cylindrical portion 52 is in close contact with both the wall surface 14 of the through hole 13 of the lid 10 and the columnar portion 22 of the terminal member 20.

In the current collecting member 30, the terminal connecting portion 31 in contact with the internal plate-shaped portion 51 of the insulator 50 is provided with the raised portion 35 uplifted toward the lid 10 more largely as is closer to the through hole 34 of the current collecting member 30. In other words, the raised portion 35 has a raised shape with a higher height toward the insulator 50 as is closer to the through hole 34. Therefore, the internal plate-shaped portion 51 is pushed by the raised portion 35 more strongly toward the outside of the outer casing 2 at a position closer to the through hole 34. When pushed by the raised portion 35, the internal plate-shaped portion 51 is partially deformed, forming the internal cylindrical portion 52. This configuration will be described in detail later. A leading end 54, i.e., an uppermost end in FIG. 2, of the internal cylindrical portion 52 protrudes more largely toward the outside of the outer casing 2, more than when the raised portion 35 is absent.

As described above, the external plate-shaped portion 41 of the gasket 40 is sandwiched between the lid 10 and the terminal member 20. Further, the internal plate-shaped portion 51 of the insulator 50 is sandwiched between the lid 10 and the current collecting member 30. Still further, the leading end 44 of the external cylindrical portion 42 of the gasket 40 and the leading end 54 of the internal cylindrical portion 52 of the insulator 50 are both located between the wall surface 14 of the through hole 13 of the lid 10 and the columnar portion 22 of the terminal member 20. The leading end 44 of the external cylindrical portion 42 of the gasket and the leading end 54 of the internal cylindrical portion 52 of the insulator 50 tightly abut on each other. This prevents contact between the lid 10 and the terminal member 20. This configuration further prevents the electrolyte 5 from entering a gap between the leading end 44 of the external cylindrical portion 42 of the gasket 40 and the leading end 54 of the internal cylindrical portion 52 of the insulator 50 and thus appropriately prevents the lid 10 and terminal member 20 from being electrically connected through the electrolyte 5. Specifically, the battery 1 can achieve high sealing at the external terminals 6 and 7 and appropriately insulate between the lid 10 and the terminal member 20. Further, since the protruding portion 15 provided on the outer surface 11 of the lid 10 bites into the gasket 40, thereby enhancing the sealing.

In the present embodiment, between the wall surface 14 of the through hole 13 of the lid 10 and the columnar portion 22 of the terminal member 20, the external cylindrical portion 42 of the gasket 40 and the internal cylindrical portion 52 of the insulator 50 respectively enter from the outside and the inside of the outer casing 2. That is, the columnar portion 22 of the terminal member 20 is covered by the gasket 40 and the insulator 50, preventing only either the gasket 40 or the insulator 50 from having an increased contact area with the columnar portion 22 of the terminal member 20. In the battery 1 configured as above, the heat generated by the terminal member 20 during charging and discharging is dispersed to both the gasket 40 and the insulator 50. Therefore, even if the terminal member 20 generates heat during charging and discharging of the battery 1, both the temperatures of the gasket 40 and the insulator 50 can be prevented from rising. In other words, both the gasket 40 and the insulator 50 can be suppressed from deteriorating in a short period due to the temperature rise. Consequently, the battery 1 can appropriately maintain insulating and sealing at the external terminals 6 and 7 over a long period.

In the battery 1 in the present embodiment, the external cylindrical portion 42 of the gasket 40 and the internal cylindrical portion 52 of the insulator 50 are in a compressed state in the thickness direction of the lid 10. Specifically, the leading end 44 of the external cylindrical portion 42 and the leading end 54 of the internal cylindrical portion 52 press against each other between the wall surface 14 of the through hole 13 of the lid 10 and the columnar portion 22 of the terminal member 20. With this configuration, even if either the external cylindrical portion 42 of the gasket 40 or the internal cylindrical portion 52 of the insulator 50 deteriorates, the other one, which has not deteriorated, is allowed to elongate toward the deteriorated one. To be concrete, for example, if the external cylindrical portion 42 of the gasket 40 deteriorates and its elasticity becomes weak, the external cylindrical portion 42 may become hard to closely contact with the wall surface 14 of the through hole 13 of the lid 10 and the columnar portion 22 of the terminal member 20. In the present embodiment, therefore, if the external cylindrical portion 42 of the gasket 40 deteriorates, the internal cylindrical portion 52 of the insulator 50 is allowed to extend as appropriate from the compressed state, causing the leading end 54 of the internal cylindrical portion 52 to press against the external cylindrical portion 42 of the gasket 40. The external cylindrical portion 42 pressed by the thus extended internal cylindrical portion 52 can properly maintain close contact with the wall surface 14 of the through hole 13 of the lid 10 and the columnar portion 22 of the terminal member 20. In other words, even if either the external cylindrical portion 42 of the gasket 40 or the internal cylindrical portion 52 of the insulator 50 deteriorates, the deteriorated one can maintain close contact with the lid 10 and the terminal member 20. Furthermore, the above configuration can suppress the generation of a gap between the external cylindrical portion 42 of the gasket 40 and the internal cylindrical portion 52 of the insulator 50. Thus, the battery 1 configured as above can appropriately maintain insulating and sealing at the external terminals 6 and 7 over a long period.

In the battery 1 of the present embodiment, the current collecting member is formed with the raised portion 35. With this raised portion 35, the internal cylindrical portion 52 of the insulator 50 can be strongly pressed against the external cylindrical portion 42 of the gasket 40. That is, the contact strength between the leading end 44 of the external cylindrical portion 42 of the gasket 40 and the leading end 54 of the internal cylindrical portion 52 of the insulator 50 can be enhanced. Furthermore, the external cylindrical portion 42 of the gasket 40 and the internal cylindrical portion 52 of the insulator 50 can be compressed more strongly in the thickness direction of the lid 10. Consequently, the battery 1 configured as above can appropriately maintain insulating and sealing at the external terminals 6 and 7 over a long period.

In the battery 1 of the present embodiment, the current collecting member 30 is formed with the tapered portion 36 on the inside surface 33 around the through hole 34. The umbrella-shaped portion 23 of the terminal member 20 is formed in close contact with the tapered portion 36. This umbrella-shaped portion 23 is made by swaging as described above. Specifically, in the swaging, a portion of the terminal member 20, which will be formed into the umbrella-shaped portion 23, is deformed to expand radially outward more than before swaging, to tightly contact with the tapered portion 36. By this swaging, the raised portion 35 of the current collecting member 30 is largely uplifted toward the insulator 50. Accordingly, the internal cylindrical portion 52 of the insulator 50 can be more strongly pressed against the external cylindrical portion 42 of the gasket 40. Thus, the battery 1 configured as above can appropriately maintain insulating and sealing at the external terminals 6 and 7 over an even longer period.

A method for producing the battery 1 will be described below. The battery 1 of the present embodiment is produced by attaching the lid 10 to the casing body 4 to assemble the outer casing 2, and injecting the electrolyte 5 into the outer casing 2. Before being attached to the casing body 4, the lid 10 is mounted with the external terminals 6 and 7 and further the power generating element 3. Specifically, in the production process of the battery 1, the terminal members 20, the current collecting members 30, the gaskets 40, and the insulators 50 for constituting the external terminals 6 and 7 are mounted to the lid 10. This mounting of the terminal members 20, the current collecting members 30, the gaskets 40, and the insulators 50 to the lid 10 is performed by stacking those members and then swaging each terminal member 20.

Figure 3:
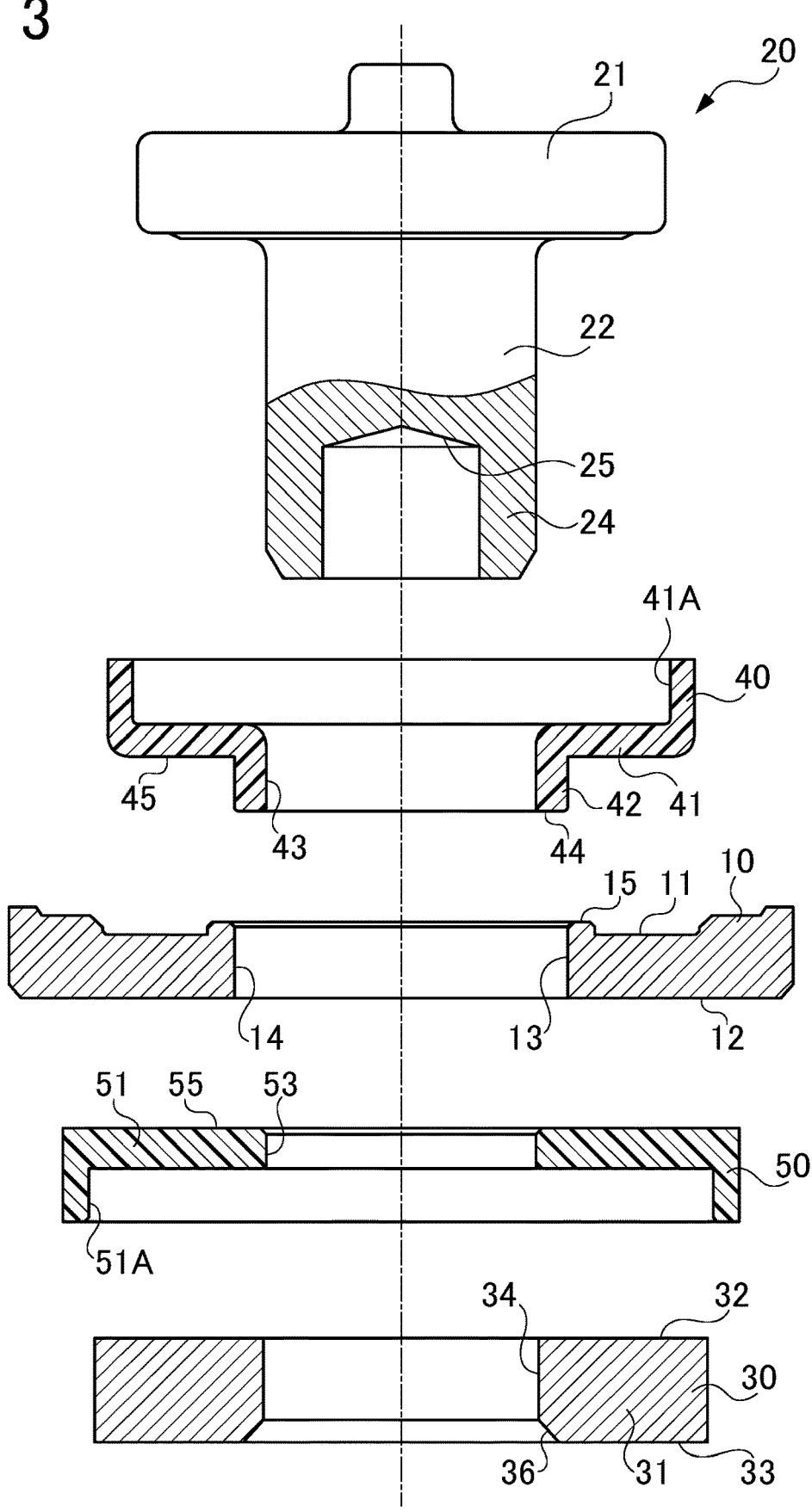
FIG. 3 is a cross-sectional view showing constituent parts or components of the external terminal of the battery before being assembled in the embodiment.

FIG. 3 is a cross-sectional view showing the above-mentioned members for constituting the external terminals 6 and 7. Specifically, FIG. 3 shows the terminal member 20, current collecting member 30, gasket 40, and insulator 50 before being mounted to the lid 10.

The terminal member 20 before being mounted to the lid 10 includes a portion to be swaged (hereinafter, a to-be-swaged portion) 24 at the end of the columnar portion 22 opposite the head portion 21. The to-be-swaged portion 24 will be shaped into the umbrella-shaped portion 23 by swaging which will be performed later. The to-be-swaged portion 24 is formed with a bottom hole 25, so that the to-be-swaged portion 24 has a hollow cylindrical shape.

Before being mounted to the lid 10, the gasket 40 in the present embodiment is not deformed yet along the contour of the protruding portion 15. In the gasket 40, a part of the inside surface 45 of the external plate-shaped portion 41, which will contact with the protruding portion 15 of the lid 10, is also not provided with a recess corresponding to the protruding portion 15. Specifically, before the gasket 40 is mounted to the lid 10, the part of the inside surface 45 of the external plate-shaped portion 41, which will contact with the protruding portion 15 of the lid 10, is flat.

The insulator 50 in the present embodiment, before being mounted to the lid 10, is not formed yet with the internal cylindrical portion 52. Specifically, before the insulator 50 is mounted to the lid 10, a part of the outside surface 55 of the internal plate-shaped portion 51, corresponding to the through hole 13 of the lid 10, is flat.

The current collecting member 30, before being mounted to the lid 10, is not formed yet with the raised portion 35. To be specific, before the current collecting member 30 is mounted to the lid 10, the outside surface 32 is flat.

Figure 4:
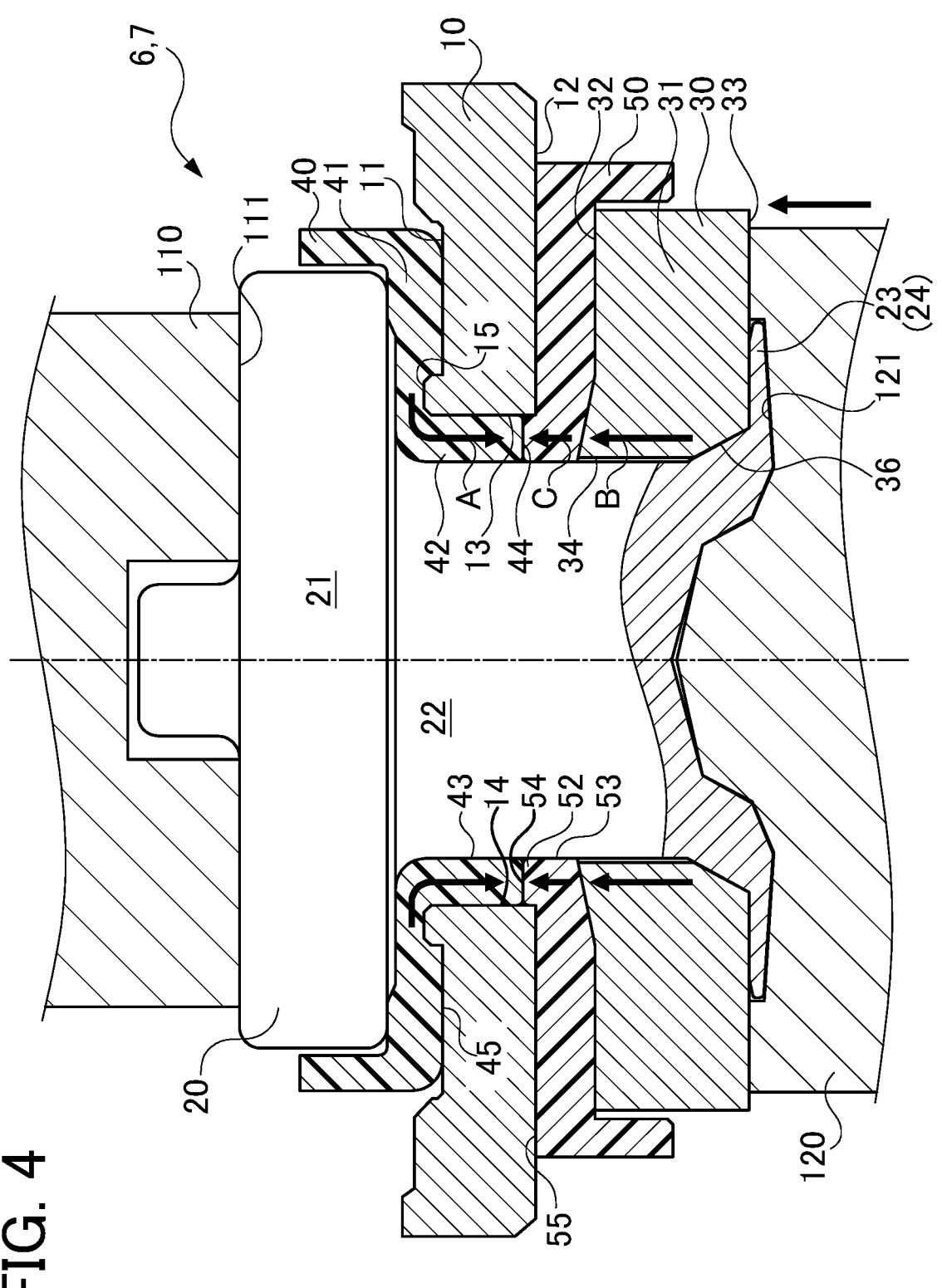
FIG. 4 is an explanatory view showing a process of swaging the external terminal of the battery in the embodiment.

FIG. 4 is an explanatory view showing a process of mounting the terminal member 20, current collecting member 30, gasket 40, and insulator 50 to the lid 10 and then swaging the to-be-swaged portion 24 of the terminal member 20. In this swaging process, as shown in FIG. 4, the terminal member 20 is pressed in its axial direction by a pair of press dies 110 and 120. The pressing direction in the swaging process is the same as the thickness direction of the lid 10.

The press die 110 has a pressing surface 111 which contacts with the top surface of the head portion 21 of the terminal member 20, and presses the head portion 21 from above in FIG. 4. The press die 120 is disposed on the opposite side of the terminal member 20 from the press die 110, i.e., on the lower side in FIG. 4. This press die 120 includes a pressing surface 121 having a shape for forming the umbrella-shaped portion 23. By swaging using the press dies 110 and 120, the to-be-swaged portion 24 of the terminal member 20 is deformed to extend radially outward along the inside surface 33 of the current collecting member 30, thus forming the umbrella-shaped portion 23 in the terminal member 20.

When the umbrella-shaped portion 23 of the terminal member 20 is formed as above, the current collecting member 30, gasket 40, and insulator 50 are held together with the lid 10 between the head portion 21 and the umbrella-shaped portion 23 of the terminal member 20. As a result, the external terminals 6 and 7 are each assembled up with respect to the lid 10. In the swaging process, the gasket 40, lid 10, insulator 50, and current collecting member 30, which are located in this order from above in FIG. 4 between the head portion 21 and the umbrella-shaped portion 23 of the terminal member 20, are compressed by the press dies 110 and 120 in the pressing direction. This pressing causes a predetermined portion of specific members to be deformed in the present embodiment.

The external plate-shaped portion 41 of the gasket 40, sandwiched between the outer surface 11 of the lid 10 and the head portion 21 of the terminal member 20, is compressed in the thickness direction by pressure in the swaging. The external plate-shaped portion 41 compressed in the thickness direction is deformed to be pressed out in a direction perpendicular to the compressing direction, that is, in a lateral direction in FIG. 4. Further, the protruding portion 15 provided on the outer surface 11 of the lid 10 bites into the inside surface 45 of the external plate-shaped portion 41. This protruding portion 15 biting as above pushes radially a contact portion of the external plate-shaped portion 41 contacting the protruding portion 15. By the compression of the external plate-shaped portion 41 in the thickness direction and the biting of the protruding portion 15 into the external plate-shaped portion 41, the external cylindrical portion 42 of the gasket 40 is deformed to elongate toward the inside of the outer casing 2 as indicated by an arrow A in FIG. 4.

The umbrella-shaped portion 23 of the terminal member 20 deformed by the swaging is in close contact with the inside surface 33 of the current collecting member 30. In the swaging, the umbrella-shaped portion 23 is pressed against the inside surface 33 of the current collecting member 30. Of the current collecting member 30, a portion around the through hole 34 is subjected to pressure in the swaging. This portion around the through hole 34 of the current collecting member pressed in the swaging is deformed toward the outside of the outer casing 2 as indicated by an arrow B in FIG. 4. The thus deformed current collecting member 30 is formed with the raised portion 35 more largely uplifting toward the insulator 50 as is closer to the through hole 34.

In the present embodiment, the current collecting member 30 is formed, on the inside surface 33 around the through hole 34, with the tapered portion 36. In the swaging process, the umbrella-shaped portion 23 is formed in the terminal member 20 by being deformed to closely contact the tapered portion 36 of the current collecting member 30. The umbrella-shaped portion 23 deformed into close contact with the tapered portion 36 causes the portion of the current collecting member 30 closer to the through hole 34 to be more largely deformed in the direction indicated by an arrow B. In other words, in the present embodiment in which the current collecting member 30 is provided with the tapered portion 36 and the umbrella-shaped portion 23 is shaped to closely contact the tapered portion 36 by swaging, so that the raised portion 35 of the current collecting member 30 is raised more largely as is closer to the through hole 34.

The internal plate-shaped portion 51 of the insulator 50 is sandwiched between the inner surface 12 of the lid 10 and the outside surface 32 of the current collecting member 30 and compressed in the thickness direction by the pressure in the swaging process. When compressed in the thickness direction, the internal plate-shaped portion 51 is deformed to be pushed out in a direction perpendicular to the compression direction, that is in a lateral direction in FIG. 4. Since the through hole 13 of the lid 10 is larger in diameter than the through hole 53 of the insulator 50, a part of the outside surface 55 of the internal plate-shaped portion 51, which is located inside the through hole 13 of the lid 10, is an uncompressed part that is not pressed by the inner surface 12 of the lid 10. This uncompressed part is thus deformed to protrude toward the outside of the outer casing 2 as indicated by an arrow C in FIG. 4, forming the internal cylindrical portion 52.

The leading end 54 of the internal cylindrical portion 52 formed in the insulator 50 abuts on the leading end 44 of the external cylindrical portion 42 of the gasket 40 in the space between the wall surface 14 of the through hole 13 of the lid and the columnar portion 22 of the terminal member 20. In the present embodiment, the external cylindrical portion 42 of the gasket 40 and the internal cylindrical portion 52 of the insulator 50 are held in a compressed state in the thickness direction of the lid 10. In the present embodiment, furthermore, the raised portion 35 presses the internal cylindrical portion 52 of the insulator 50 more strongly against the external cylindrical portion 42 of the gasket 40. In addition, in the present embodiment, since the umbrella-shaped portion 23 is shaped to closely contact the tapered portion 36 by swaging, so that the raised portion 35 is uplifted largely.

The battery 1 configured as above in the present embodiment includes the outer casing 2, the power generating element 3, the terminal member 20, the current collecting member 30, the gasket 40, and the insulator 50. The outer casing 2 includes the lid 10 formed with the through hole 13. The power generating element 3 is accommodated in the outer casing 2. The terminal member 20 extends through the through hole 13 of the lid 10 into and out of the outer casing 2. The current collecting member 30 connects the power generating element 3 and the terminal member 20 within the outer casing 2. The gasket 40 is an external insulation member placed outside the outer casing 2 and insulates the terminal member 20 from the lid 10. The insulator 50 is an internal insulation member placed inside the outer casing 2 and insulates the current collecting member 30 from the lid 10. The current collecting member 30 is formed with the through hole 34 at a position overlapping the through hole 13 of the lid 10. The terminal member 20 includes the head portion 21, the columnar portion 22, and the umbrella-shaped portion 23. The columnar portion 22 is located in the through hole 13 of the lid 10 and the through hole 34 of the current collecting member 30. The head portion 21 is continuous to the columnar portion 22 and extends radially outward, outside the outer casing 2, to have a larger diameter than the through hole 13 of the lid 10. The umbrella-shaped portion 23 is continuous to the columnar portion 22 and extends radially outward, inside the outer casing 2, to have a larger diameter than the through hole 34 of the current collecting member 30, so that the umbrella-shaped portion 23 is in close contact with the inside surface 33 of the current collecting member 30. The gasket 40 includes the external plate-shaped portion 41 and the external cylindrical portion 42. The external plate-shaped portion 41 is held between the outer surface 11 of the lid 10 and the head portion 21 of terminal member 20. The external cylindrical portion 42 is continuous to the external plate-shaped portion 41 and held between the wall surface 14 defining the through hole 13 of the lid 10 and the columnar portion 22. The insulator 50 includes the internal plate-shaped portion 51 and the internal cylindrical portion 52. The internal plate-shaped portion 51 is held between the inner surface 12 of the lid and the current collecting member 30. The internal cylindrical portion 52 is continuous to the internal plate-shaped portion 51 and held between the wall surface 14 of the through hole 13 of the lid 10 and the columnar portion 22. Further, the leading end 44 of the external cylindrical portion 42 and the leading end 54 of the internal cylindrical portion 52 are in close contact with each other in the space between the wall surface 14 of the through hole 13 of the lid 10 and the columnar portion 22. The battery 1 configured as above can disperse the heat generated by the terminal member 20 during charging and discharging to both the gasket 40 and the insulator 50, thus enabling to suppress a temperature rise in both the gasket 40 and the insulator 50. Thus, both the gasket 40 and the insulator 50 can be prevented from deteriorating in a short period due to the temperature rise. According to the present embodiment, therefore, the battery can appropriately maintain insulating and sealing between the outer casing and the terminal member over a long period.

The foregoing embodiments are mere examples and give no limitation to the present disclosure. The present disclosure may be embodied in other specific forms without departing from the essential characteristics thereof.

For example, the foregoing embodiment exemplifies that the terminal member 20 is mounted to the lid 10, which is one of members constituting the outer casing 2. However, the terminal member needs only be provided in an outer casing of a battery. Specifically, for example, the present disclosure is applicable to a battery in which a terminal member is provided in a through hole of a casing.

In the foregoing embodiment, for instance, the gasket 40 and the insulator 50 are made of different materials, but the gasket 40 and the insulator 50 may be made of the same material. However, when the gasket 40 and the insulator 50 are made of the different materials, even if either one deteriorates in material, the other may be suppressed from deterioration in material. Even if the one deteriorates, the other that has not deteriorated can extend just by that much toward the deteriorated one, allowing the deteriorated one to maintain contact performance. In other words, the gasket 40 and the insulator 50, made of different materials, can maintain appropriate insulating and sealing between the outer casing 2 and the terminal member 20 reliably over a long period.

The foregoing embodiment exemplifies that the insulator 50 before being mounted to the lid 10 has no internal cylindrical portion 52. As an alternative, an insulator before being mounted to an outer casing may already have an internal cylindrical portion.

In the foregoing embodiment, for instance, the terminal member 20 is a single member, but may be composed of multiple members. Specifically, for example, a terminal member may be composed of a head portion and a columnar portion, which are separate members and integrally connected together.

The foregoing embodiment exemplifies that the present disclosure is applied to a battery having a flat rectangular outer shape, but may be applied to batteries having any outer shapes without any particular limitations. Moreover, the present disclosure is applicable to batteries of any types, e.g., a nickel hydride battery, a lithium-ion battery, etc., without any particular limitations.

The battery according to the present disclosure may be configured such that the external cylindrical portion and the internal cylindrical portion are compressed in a thickness direction of the outer casing between the wall surface defining the through hole of the outer casing and the columnar portion of the terminal member. With this configuration, even if either the external cylindrical portion or the internal cylindrical portion deteriorates, the other that has not deteriorated can extend just by that much toward the deteriorated one. Accordingly, even if one of the external cylindrical portion and the internal cylindrical portion deteriorates, this deteriorated one can maintain contact performance. Further, the above configuration can suppress the generation of a gap between the external cylindrical portion and the internal cylindrical portion. Thus, the battery configured as above can appropriately maintain insulating and sealing between the outer casing and the terminal member over a long period.

The battery according to the present disclosure may be configured such that the current collecting member includes a raised portion on an outside surface around the through hole, the raised portion that is more largely uplifted toward the internal insulation member as it is closer to the through hole of the current collecting member. With this configuration, the internal cylindrical portion can be strongly pressed against the external cylindrical portion. In other words, the contact strength between the leading end of the external cylindrical portion and the leading end of the internal cylindrical portion can be enhanced. Consequently, the battery configured as above can appropriately maintain insulating and sealing between the outer casing and the terminal member over a long period.

The battery according to the present disclosure may be configured such that he current collecting member includes a tapered portion on the inside surface around the through hole, the tapered portion being more largely depressed as closer to the through hole, and the umbrella-shaped portion of the terminal member is in close contact with the inside surface and the tapered portion. With this configuration, the internal cylindrical portion can be further strongly pressed against the external cylindrical portion. Consequently, the battery configured as above can further appropriately maintain insulating and sealing between the outer casing and the terminal member over a long period.

REFERENCE SIGNS LIST

1 Battery
2 Outer casing
3 Power generating element
10 Lid
11 Outer surface
12 Inner surface
13 Through hole
14 Wall surface
20 Terminal member
21 Disc-shaped portion
22 Columnar portion
23 Umbrella-shaped portion
30 Current collecting member
33 Inside surface
34 Through hole 35 Raised portion
36 Tapered portion
40 Gasket (External insulation member)
41 External plate-shaped portion
42 External cylindrical portion
44 Leading end
50 Insulator (Internal insulation member)
51 Internal plate-shaped portion
52 Internal cylindrical portion
54 Leading end

What is claimed is:
1. A battery comprising:
an outer casing formed with a through hole;
a power generating element housed in the outer casing;
a terminal member provided extending through the through hole into and out of the outer casing;
a current collecting member connecting the power generating element and the terminal member within the outer casing;
an external insulation member placed outside the outer casing to insulate the terminal member from the outer casing; and
an internal insulation member placed inside the outer casing to insulate the current collecting member from the outer casing,
wherein the current collecting member is formed with a through hole at a position overlapping the through hole of the outer casing,
the terminal member includes:
    a columnar portion located in the through hole of the outer casing and the through hole of the current collecting member;
    a head portion continuous to the columnar portion, the head portion radially extending, outside the outer casing, to have a larger diameter than the through hole of the outer casing; and
    an umbrella-shaped portion continuous to the columnar portion, the umbrella-shaped portion radially extending, inside the outer casing more than the current collecting member, to have a larger diameter than the through hole of the current collecting member, so that the umbrella-shaped portion is in close contact with an inside surface of the current collecting member, the external insulation member includes:
    an external plate-shaped portion held between an outer surface of the outer casing and the head portion of the terminal member; and
    an external cylindrical portion continuous to the external plate-shaped portion and held between a wall surface defining the through hole of the outer casing and the columnar portion of the terminal member,
the internal insulation member includes:
    an internal plate-shaped portion held between an inner surface of the outer casing and the current collecting member; and
    an internal cylindrical portion continuous to the internal plate-shaped portion and held between the wall surface defining the through hole of the outer casing and the columnar portion of the terminal member, and
a leading end of the external cylindrical portion of the external insulation member and a leading end of the internal cylindrical portion of the internal insulation member are in close contact with each other between the wall surface defining the through hole of the outer casing and the columnar portion of the terminal member.
2. The battery according to claim 1, wherein the external cylindrical portion and the internal cylindrical portion are compressed in a thickness direction of the outer casing between the wall surface defining the through hole of the outer casing and the columnar portion of the terminal member.
3. The battery according to claim 2, wherein the current collecting member includes a tapered portion on the inside surface around the through hole, the tapered portion being more largely depressed as closer to the through hole, and
the umbrella-shaped portion of the terminal member is in close contact with the inside surface and the tapered portion.
4. The battery according to claim 1, wherein
the current collecting member includes a tapered portion on the inside surface around the through hole, the tapered portion being more largely depressed as closer to the through hole, and
the umbrella-shaped portion of the terminal member is in close contact with the inside surface and the tapered portion.

* * * * *